United States Patent [19]

Mimura

[11] Patent Number: 5,089,804
[45] Date of Patent: Feb. 18, 1992

[54] SHORT-CIRCUIT AND GROUND FAULT DETECTING APPARATUS FOR AUTOMOTIVE ELECTROMAGNETIC CLUTCHES

[75] Inventor: Munehiko Mimura, Hyogo, Japan

[73] Assignee: Mitsubishi Denki K.K., Tokyo, Japan

[21] Appl. No.: 545,736

[22] Filed: Jun. 29, 1990

[30] Foreign Application Priority Data

Jun. 30, 1989 [JP] Japan ................... 1-170248

[51] Int. Cl.$^5$ .............................................. B60Q 1/00
[52] U.S. Cl. ...................................... 340/453; 340/438
[58] Field of Search ............... 340/453, 438, 650, 652;
364/551.01; 192/30 W

[56] References Cited

FOREIGN PATENT DOCUMENTS

| 57-15024 | 1/1982 | Japan . |
| 63-57342 | 3/1988 | Japan . |
| 2089458 | 5/1982 | United Kingdom . |
| 2186755 | 8/1987 | United Kingdom . |
| 06138 | 10/1986 | World Int. Prop. O. . |

Primary Examiner—Jin F. Ng
Assistant Examiner—Brian R. Tumm
Attorney, Agent, or Firm—Sughrue, Mion, Zinn, Macpeak & Seas

[57] ABSTRACT

The short-circuit and ground fault detecting apparatus for automotive electromagnetic clutches consists of a clutch current calculating device, a clutch current control device, and a clutchoutput cir;cuit operation detecting device. The clutch current control device has two output transistors on the positive and negative side of the clutch, serving as switches connected to current supply mechanisms of the magnetic clutch. The magnetic clutch is energized and deenergized by turning on and off the output transistors. The voltages at the output transistors are sent to the clutch output circuit operation detecting device, where they are removed of ripples and converted into digital signals and then fed back to the clutch current calculating device, which in turn checks the digitized voltages for any fault. In the event of a failure of the clutch current control device due to short-circuit or ground fault, the clutch current calculating device takes the resultant abnormal voltages as an indication of the fault and takes necessary actions to turn off the two output transistors, thereby releasing the clutch and protecting these transistors from damage.

2 Claims, 3 Drawing Sheets

SHORT-CIRCUIT AND GROUND FAULT DETECTING APPARATUS FOR AUTOMOTIVE ELECTROMAGNETIC CLUTCHES

BACKGROUND OF THE INVENTION

The present invention relates to a short-circuit and ground fault detecting apparatus for automotive electromagnetic clutches which can detect various faults including ground and short-circuit faults and change a clutch current command signal according to the output terminal voltages of the clutch, thereby protecting output transistors against ground and short-circuit faults.

PRIOR ART

FIG. 3 is a block diagram showing the configuration of a conventional automotive electromagnetic clutch controller disclosed in the Japanese Patent Preliminary Publication No. Showa 63-57342. In the figure, reference numeral 1 represents a clutch current control means; 2 a clutch current calculating means such as a microcomputer; 3 an on-board battery; and 4 an electromagnetic clutch.

A clutch current command signal $S_I$ output from the clutch current calculating means 2 is supplied to a positive input terminal of a differential amplifier 14 in the clutch current control means 1. The clutch current calculating means 2 also produces a clutch opening signal $S_O$ for the electromagnetic clutch 4, which is fed to the base of a transistor 12 on the negative side working as an output transistor in the clutch current control means 1.

The emitter of the negative side transistor 12 is connected through a clutch current detecting resistor 13 to the negative electrode of the on-board battery 3 and is also earthed. The emitter of the negative side transistor 12 supplies a current feedback signal $S_F$ to the negative input terminal of the differential amplifier 14.

The differential amplifier 14 calculates the difference between the clutch current command signal $S_I$ and the current feedback signal $S_F$ and sends the result through a pulse width modulator (PWM) 15 to the base of a positive side transistor 11, which serves as an output transistor, in order to turn it on and off.

The emitter of the positive side transistor 11 is connected to the positive electrode of the on-board battery 3. The collector of the positive side transistor 11 is earthed through a parallel circuit of a circulation diode 16 and a reverse excitation resistor 18 and is also connected to an output terminal 20.

The collector of the negative side transistor 12 is connected to the positive electrode of the on-board battery 3 through a parallel circuit made up of a reverse excitation resistor 19 and an overvoltage suppression diode 17 and is also connected to an output terminal 21.

The reverse excitation resistors 18, 19 are to pass a small reverse excitation current through the magnetic clutch 4 when the output transistors 11, 12 are both turned off.

The output terminals 20, 21 are those of the clutch current control means 1 and are connected to current feed mechanisms 42a, 42b of the magnetic clutch 4, respectively. The magnetic clutch 4 consists of an excitation coil 41 and two current feed mechanisms 42a, 42b, all connected in series.

The clutch current calculating means 2 is given driving control information $S_D$ and engine control information $S_E$.

Now, the operation of the above configuration is described below. The clutch current calculating means 2 first performs a car speed computation, followed by an engine revolution calculation. It also takes in the driving control information $S_D$ and the engine control information $S_E$ and, from all these information, calculates a clutch torque. The clutch current calculating means 2 then produces a clutch current corresponding to the clutch torque.

When the electromagnetic clutch 4 is to be released, the positive side transistor 11 and the negative side transistor 12 are both turned off by the output of the PWM 15 and the clutch opening signal $S_O$ from the clutch current calculating means 2. As a result, a small reverse exciting current flows in the electromagnetic clutch 4 through the reverse excitation resistors 18, 19.

When the electromagnetic clutch 4 is to be engaged, the negative side transistor 12 is left turned on and the clutch current is detected by the clutch current detecting resistor 13. A feedback value of the clutch current detected by the clutch current detecting resistor 13, i.e., the current feedback signal $S_F$, is applied to the negative input terminal of the differential amplifier 14. At the positive input terminal, the differential amplifier 14 is supplied with the clutch current command signal $S_I$ from the clutch current calculating means 2. The differential amplifier 14 then compares the clutch current command signal $S_I$ and the current feedback signal $S_F$ to determine the difference between the two signals and output the difference to the PWM 15. The PWM 15 now performs the pulse width modulation on the output of the differential amplifier 14 and gives the modulated signal to the base of the positive transistor 11. The positive transistor 11 is turned on and off according to the pulse width of the output signal from the PWM 15 to control the clutch current flowing through the electromagnetic clutch 4.

The circulation diode 16 passes a circulating current when the positive side transistor 11 is turned off.

Another type of automotive electromagnetic clutch control apparatus is disclosed in the Japanese Patent Preliminary Publication No. Showa 57-15024. This apparatus controls the electromagnetic clutch interposed between the automotive engine and the transmission according to the gear-shift operation and the accelerator pedal operation in order to automate the clutch operation during gear shifting. The apparatus also is equipped with a means to control the energization of the magnetic clutch according to the output signal of the car speed detecting means. When the car is traveling at speeds higher than a specified velocity, the magnetic clutch control apparatus fully energizes the electromagnetic clutch regardless of whether the accelerator pedal is released or not, to enable an engine brake during deceleration. On the other hand, when the car speed reaches the preset value with the accelerator pedal released, the control apparatus prevents the electromagnetic clutch from being fully energized instantly, allowing the clutch energization to be gradually increased so that the clutch slowly engages. This reduces a shock that would occur if an engine brake was suddenly activated when the car traveling on the down slope reaches a preset speed.

In these conventional automotive electromagnetic clutch control apparatuses, the operating condition of the clutch current control means 1 is not fed back to the clutch current calculating means 2. Therefore, various unpredictable failure conditions cannot be dealt with properly. Such apparatuses when used on automobiles will pose problems of safety and reliability.

The present invention has been accomplished to overcome the above drawbacks. It is an object of this invention to provide a short-circuit and ground fault detecting apparatus for automotive electromagnetic clutches, which can detect various failures such as ground and short-circuit faults by checking the operating condition of the clutch current control means and thereby protect the output transistors of the clutch current control means against ground and short-circuit faults.

SUMMARY OF THE INVENTION

The short-circuit and ground fault detecting apparatus for automotive electromagnetic clutches according to this invention, comprises: a clutch output circuit operation detecting means for detecting output terminal voltages of the electromagnetic clutch; and a clutch current calculating means for taking in engine control information and driving control information and also the output terminal voltages from the clutch output circuit operation detecting means and then outputting a clutch current command signal and a clutch opening signal, said clutch current calculating means also being adapted to change the clutch current command signal according to the output terminal voltages and a specified clutch current command signal.

The clutch output circuit operation detecting means takes in the output terminal voltages of the electromagnetic clutch and sends it to the clutch current calculating means. The clutch current calculating means produces a clutch current command signal and a clutch opening signal according to the driving control information and the engine control information and, at the same time, changes the clutch current command signal according to the output terminal voltages and a specified clutch current command signal. The clutch current calculating means also checks the output terminal voltages of the electromagnetic clutch for any ground or short-circuit fault.

PREFERRED EMBODIMENT OF THE INVENTION

Figure 1:
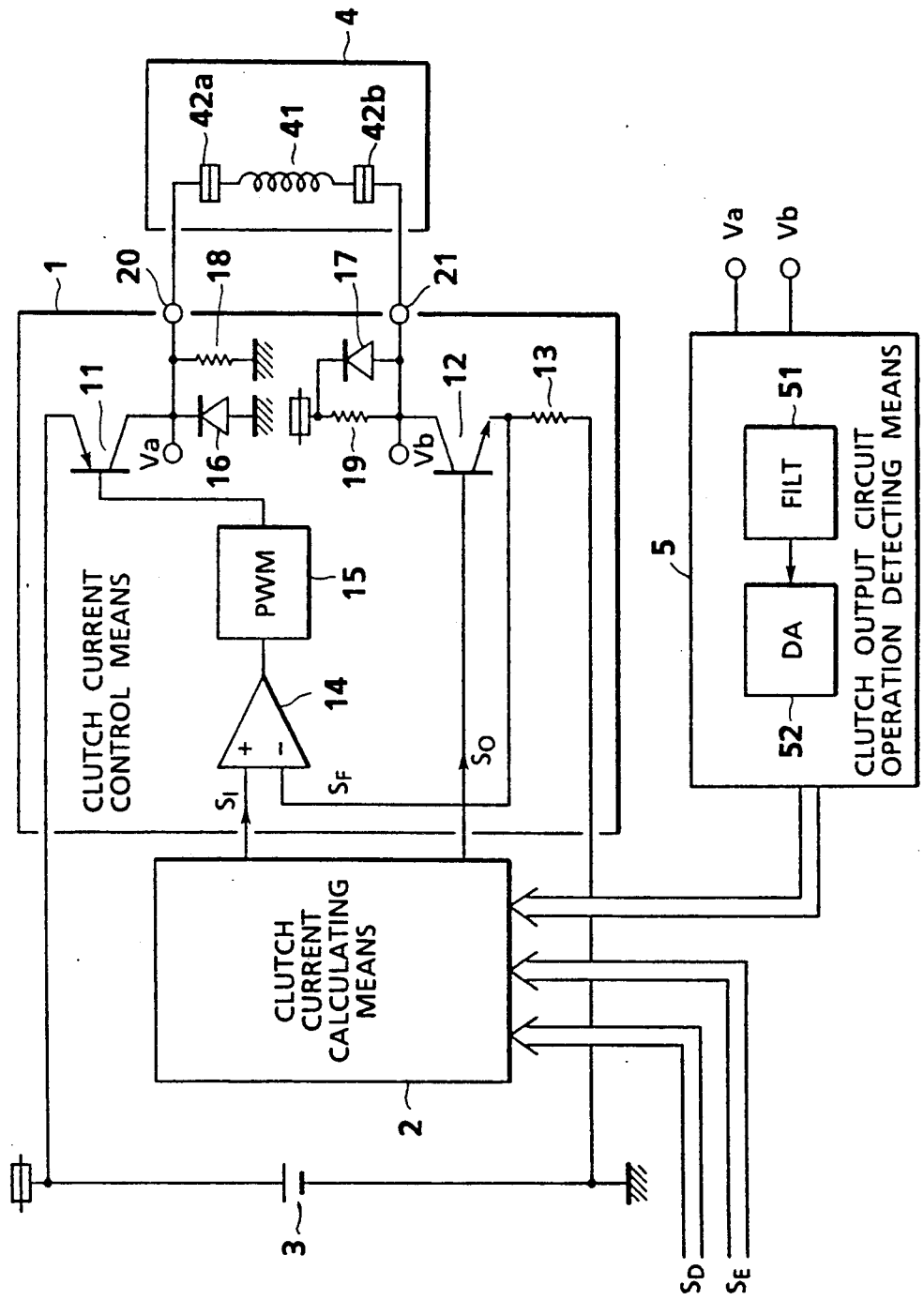
FIG. 1 is a block diagram showing the short-circuit and ground fault detecting apparatus for automotive electromagnetic clutch as one embodiment of this invention.

Now, a short-circuit and ground fault detecting apparatus for automotive electromagnetic clutches according to this invention will be described by referring to the accompanying drawings. FIG. 1 is a block diagram illustrating the configuration of one embodiment.

Figure 3:
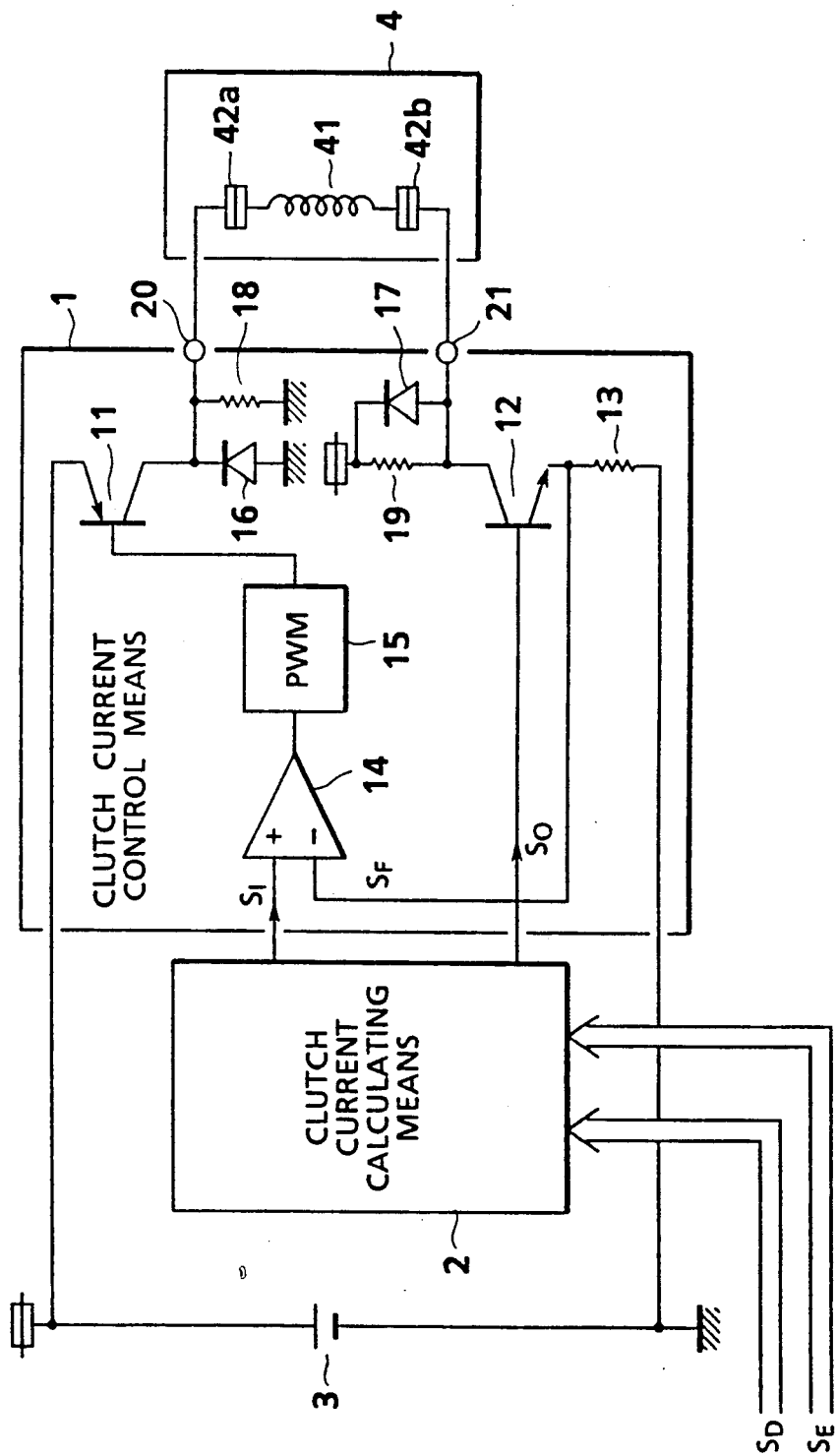
FIG. 3 is a block diagram showing the conventional control apparatus for automotive electromagnetic clutches.

In FIG. 1, components identical with those of FIG. 3 are given like reference numerals and not explained here again. Only the parts different from those of FIG. 3 will be explained. The configuration of FIG. 1 has a clutch output circuit operation detecting means t added to the circuit of FIG. 3. The clutch output circuit operation detecting means 5 takes in clutch output terminal voltages $V_a$, $V_b$ from both terminals of the electromagnetic clutch 4, i.e., from the output terminals 20, 21 of the clutch current control means 1.

The circuit operation detecting means 5 includes a filter 51 and an analog/digital (A/D) converter 52. The output terminal voltages $V_a$, $V_b$ are smoothed by the filter 51 and converted by the A/D converter 52 into digital signals, which are sent to the clutch current calculating means 2. In other words, the operation condition of the clutch current control means 1 is fed back to the clutch current calculating means 2 through the clutch output circuit operation detecting means 5. Other aspects of the circuit configuration are identical with those of FIG. 3.

Next, the operation of the embodiment will be explained. The clutch current calculating means 2 supplies a clutch current command signal $S_I$ to the positive input terminal of the differential amplifier 14. The current feedback signal $S_F$ produced by the clutch current detection resistor 13 is entered into the negative input terminal of the differential amplifier 14. The differential amplifier 14 takes the difference between the clutch current command signal $S_I$ and the current feedback signal $S_F$ and then gives the calculated difference to the pulse width modulator (PWM) 15.

The PWM 15 performs the pulse-width modulation on the output signal from the differential amplifier 14 and supplies the modulated signal to the base of the positive side transistor 11, which is turned on or off according to the pulse width of the output signal from the PWM 15. When the transistor 11 is turned on, the electromagnetic clutch 4 is energized.

On the other hand, the negative side transistor 12 is applied at its base with a clutch opening signal $S_O$ from the clutch current calculating means 2. The clutch opening signal $S_O$ turns the transistor 12 on when the magnetic clutch is energized and off when it is deenergized. In this way the negative side transistor 12 is controlled.

When both the positive side transistor 11 and the negative side transistor 12 are off, the electromagnetic clutch 4 is disengaged. To eliminate a small transmission torque produced by the residual magnetic flux of the clutch, a reverse excitation current is supplied from the on-board battery 3 to the electromagnetic clutch 4 through the reverse excitation resistors 18, 19.

When the electromagnetic clutch 4 is engaged and the positive side transistor 11 is turned off, a circulating current flows through the circulation diode 16.

The overvoltage suppression diode 17 absorbs surge voltages of the negative side transistor 12 and acts to cut off the clutch current rapidly.

With the positive and negative side transistors 11, 12 operated in this way, the electromagnetic clutch 4 is supplied with current, producing output terminal voltages $V_a$, $V_b$ at the output terminals 20, 21 of the clutch current control means 1. The output terminal voltages $V_a$, $V_b$ are entered into the filter 51 of the clutch output circuit operation detecting means 5. The filter 51 is to suppress voltage control ripples caused by the pulse width modulation of the PWM 15. With ripples removed by the filter 51, the output terminal voltages $V_a$, $V_b$ are converted by the A/D converter 52 into digital signals, which are then fed back to the clutch current calculating means 2.

Figure 2:
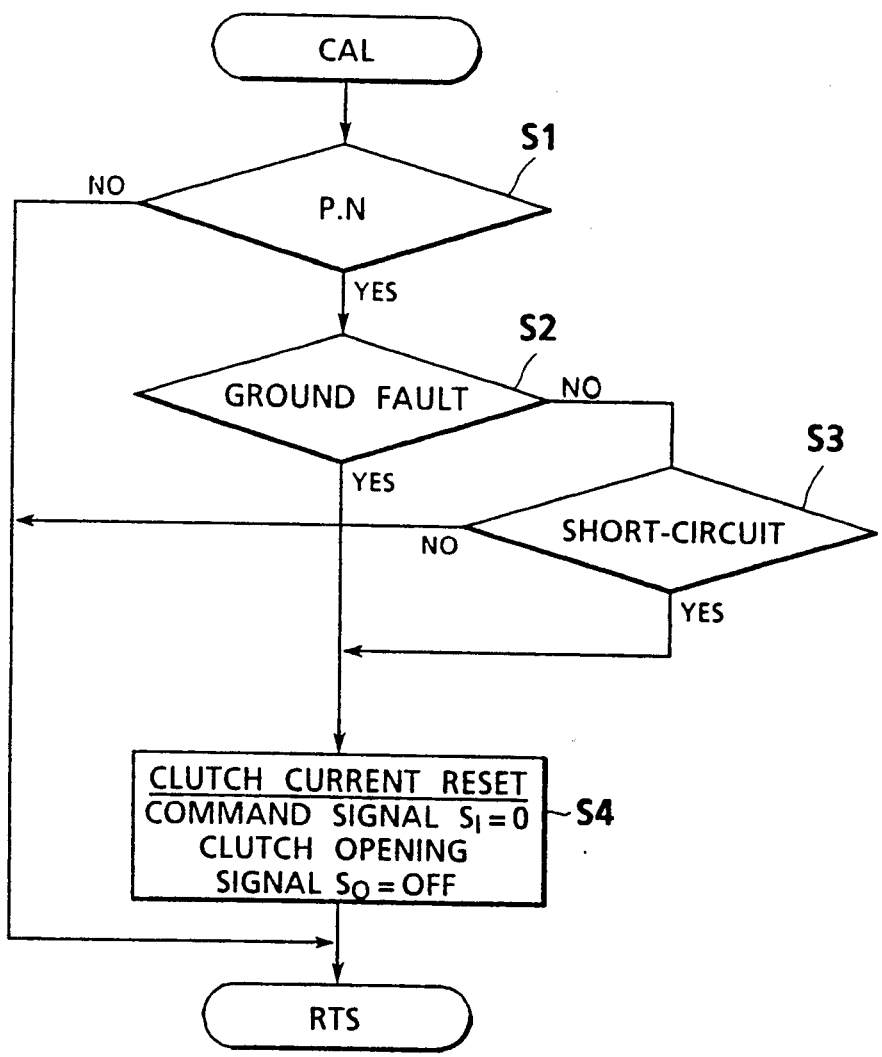
FIG. 2 is a flowchart showing the process of generating the clutch current command signal as performed by the clutch current calculating means of the invention.

The process of calculating the clutch current command signal $S_I$ as performed by the clutch current calculating means 2 will be explained by referring to the flowchart of FIG. 2. At step S1, the clutch current calculating means 2 checks whether the transmission range switch signal—which is obtained from the driving control information $S_D$ and the engine control information $S_E$—represents the transmission gear position of "P" or "N." When the transmission gear is determined to be in the "P" or "N" position, then it is checked at step S2 if there is a ground fault and at step S3 if there is a shortcircuit fault. The detection of such faults is based on the fact that in the event of fault the output terminal voltages $V_a$, $V_b$ will deviate from what should be during the normal condition. When any of these faults occur, the means 2 decides at step S4 that there is an abnormal condition with the clutch current control means and then resets the clutch current command signal $S_I$—which was calculated by the clutch current calculating means 2—to $S_I=0$ and turns off $S_O$. This releases the clutch.

As described above, since in this invention the output terminal voltages of the clutch are fed back through the clutch output circuit operation detecting means to the clutch current calculating means so as to change the clutch current command signal according to the output terminal voltages and a specified clutch current command signal, not only can a desired clutch current control be performed according to the driving control information and the engine control information, but also various failures such as ground and short-circuit faults can be detected and necessary actions taken according to the condition of the clutch current control means. This in turn protects the positive and negative side transistors from abnormal conditions in the clutch current control means.

What is claimed is:

1. A short-circuit and ground fault detecting apparatus adapted for use with an automotive electromagnetic clutch, comprising:
    a clutch output circuit operation detecting means for detecting a plurality of output terminal voltages of the electromagnetic clutch;
    a clutch current calculating means for producing a clutch current command signal and a clutch opening signal for the electromagnetic clutch according to driving control information and engine control information, said clutch current calculating means also being adapted to change the clutch current command signal according to said plurality of said output terminal voltages fed back from the clutch output circuit operation detecting means and to a clutch current command signal last outputted; and
    a clutch current control means for controlling the current supply to the electromagnetic clutch according to the difference between the clutch current command signal and a clutch current feedback signal and to the clutch opening signal, said clutch current calculating means comprising resetting means for resetting said last outputted clutch current command signal and turning-off means for turning-off said clutch opening signal,
    wherein when said clutch current calculating means determines an abnormality in said clutch current control means, said resetting means resets said last outputted clutch current command signal and said turning-off means turns off said clutch opening signal to release said clutch.

2. A short-circuit and ground fault detecting apparatus for an automotive electromagnetic clutch as claimed in claim 1, wherein said clutch current control means includes a pulse width modulator, and wherein said clutch output circuit operation detecting means includes a filter to suppress voltage control ripples caused by a pulse width modulation of said plurality of said output terminal voltages of said electromagnetic clutch by said pulse width modulator and an analog-digital converter to convert said plurality of output terminal voltages which have been filtered by said filter to a digital signal.

* * * * *